United States Patent
Chou et al.

(10) Patent No.: US 8,009,831 B2
(45) Date of Patent: Aug. 30, 2011

(54) METHOD AND SYSTEM FOR HIDING THE DECRYPTION KEY IN A DISPERSIVE WAY

(75) Inventors: Chi-Yang Chou, Kao-hsiung (TW);
 Pei-Yen Chou, Hsin-chu (TW);
 Yeu-Chung Lin, Chang-hua (TW)

(73) Assignee: Condel International Technologies Inc., George Town (KY)

(*) Notice: Subject to any disclaimer, the term of this patent is extended or adjusted under 35 U.S.C. 154(b) by 546 days.

(21) Appl. No.: 12/164,448

(22) Filed: Jun. 30, 2008

(65) Prior Publication Data
 US 2009/0323960 A1 Dec. 31, 2009

(51) Int. Cl.
 *H04L 9/00* (2006.01)
 *H04L 9/08* (2006.01)
 *H04L 29/06* (2006.01)
 *H04L 9/32* (2006.01)

(52) U.S. Cl. ......... 380/44; 380/277; 380/278; 380/45; 713/150; 713/168; 713/171

(58) Field of Classification Search .......... 380/277, 380/278, 44, 45; 726/2, 3, 21, 26, 27; 713/150, 713/168, 171
See application file for complete search history.

(56) References Cited

U.S. PATENT DOCUMENTS

| | | | | |
|---|---|---|---|---|
| 6,636,966 | B1* | 10/2003 | Lee et al. | 713/165 |
| 7,702,592 | B2* | 4/2010 | Taylor | 705/71 |
| 7,840,818 | B2* | 11/2010 | Sabet-Sharghi et al. | 713/193 |
| 2003/0091186 | A1* | 5/2003 | Fontijn et al. | 380/201 |
| 2006/0045270 | A1* | 3/2006 | Cohen | 380/268 |
| 2007/0095928 | A1* | 5/2007 | Balinsky et al. | 235/492 |
| 2007/0219911 | A1* | 9/2007 | Abe | 705/51 |
| 2008/0170689 | A1* | 7/2008 | Boubion et al. | 380/260 |
| 2009/0323966 | A1* | 12/2009 | Chou et al. | 380/278 |
| 2010/0052852 | A1* | 3/2010 | Mohanty | 340/5.83 |

* cited by examiner

*Primary Examiner* — Philip Chea
(74) *Attorney, Agent, or Firm* — Thomas|Kayden

(57) ABSTRACT

A method for hiding the decryption key in a dispersive way is disclosed. A decryption key corresponding to content to be accessed is decomposed into at least two partial decryption keys, comprising first partial decryption key and second partial decryption key. The first partial decryption key is stored in a memory device. The second partial decryption key is stored in a hidden area of the memory device. When the memory device is installed on an electronic device, an application installed in the electronic device is activated. The application retrieves the first partial decryption key from the memory device and the second partial decryption key from the hidden area of the memory device, re-organizes and codes the first and second partial decryption keys to recover the decryption key, and decrypts the content using the decryption key, enabling the electronic device to access the content.

13 Claims, 3 Drawing Sheets

METHOD AND SYSTEM FOR HIDING THE DECRYPTION KEY IN A DISPERSIVE WAY

BACKGROUND OF THE INVENTION

1. Field of the Invention

The invention relates to data encryption and decryption, and more particularly to a method and system for hiding a decryption key in a dispersive way.

2. Description of the Related Art

Data delivery comprises on-line delivery and off-line delivery. The on-line delivery process transmits contents to consumers via a network. The off-line delivery process pre-loads contents in a specific storage medium, such as a compact disc, a digital versatile disc, or a flash memory device like a memory card or a universal serial bus (USB) disc.

FIG. 1 is a schematic view of a conventional method for data encryption and decryption for digital rights management.

When digital rights management of data content is implemented on a storage medium, the content is first encrypted and it is determined whether or not a decryption key is hidden in the storage medium (step S101). If the decryption key is not hidden in the storage medium, the decryption key is required to be downloaded from a remote server via a network, such as internet (step S102). If the decryption key is hidden in the storage medium, an electronic device (such as a personal computer or a mobile phone) retrieves the decryption key to perform content decryption (step S103) and accesses the content when the decryption is complete (step S104).

Since the decryption key is hidden in the storage medium, it is an important object to protect the decryption key from being illegally detected and retrieved. Typically, content pre-loaded in DVD or SD card is protected by the method "Content Protection for Pre-recorded Media" (CPRM). The decryption key for such an encryption is represented by a 64-bit key block, comprising storage medium information (such as product type, manufacturer, and so on). The key block is stored in a hidden area of the storage medium, which cannot be accessed by ordinary consumers. The access of the key block must be implemented on an electronic device. Content must be encrypted using the key block that can be used in an authorized electronic device. Additionally, the manufacturer for the electronic device is required to join an industry association, such as the Secured Disk Association (SDA), to be authorized and be able to retrieve the key block from hidden area of SD card.

The described decryption key protection has some drawbacks. Content providers and manufacturers for electronic devices must join in an industry association with defined industry agreements whereby each member must comply with, such as the SDA. Thus, completely protecting the decryption key and provided content. However, such associations and agreements are not easily created and defined, like the competition between the Blue-ray disc association and the HD DVD association. While the protection is beneficial, illegal hacker attacks still occur. Additionally, at times, there exists differences on commercial benefits between content providers and the manufacturers for electronic devices, whereby protection scheme cannot be thoroughly abided by, and hence there might exist certain loophole in the entire protection scheme. Furthermore, the decryption key is stored in a single hidden area. While the hidden area is inaccessible for the average consumer, those skilled in the art can access the hidden area. When the hidden area is accessed, the decryption key can be retrieved to compromise the encryption protected content.

Thus, a method and system for hiding the decryption key in a dispersive way is desirable.

BRIEF SUMMARY OF THE INVENTION

Methods for hiding the decryption key in a dispersive way are provided. An exemplary embodiment of a method for hiding the decryption key in a dispersive way comprises the following. A decryption key corresponding to content to be accessed is decomposed into at least two partial decryption keys, comprising first partial decryption key and second partial decryption key. The first partial decryption key is stored in a memory device. The second partial decryption key is stored in a hidden area of the memory device. When the memory device is installed on an electronic device, an application installed in the electronic device is activated. The application retrieves the first partial decryption key from the memory device and the second partial decryption key from the hidden area of the memory device, re-organizes and codes the first and second partial decryption key to recover the decryption key, and decrypts the content using the decryption key, enabling the electronic device to access the content.

Systems for hiding the decryption key in a dispersive way are provided. An exemplary embodiment of a system of hiding the decryption key in a dispersive way comprises a memory device and an electronic device. The memory device stores first partial decryption key of a decryption key corresponding to the content to be accessed and provides a hidden area to store second partial decryption key of the decryption key. The electronic device is installed with an application. When the memory device is installed on the electronic device, the application is activated to retrieve the first partial decryption key from the memory device and the second partial decryption key from the hidden area of the memory device, re-organize and code the first and second partial decryption keys to recover the decryption key, and decrypt the content using the decryption key, enabling the electronic device to access the content A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
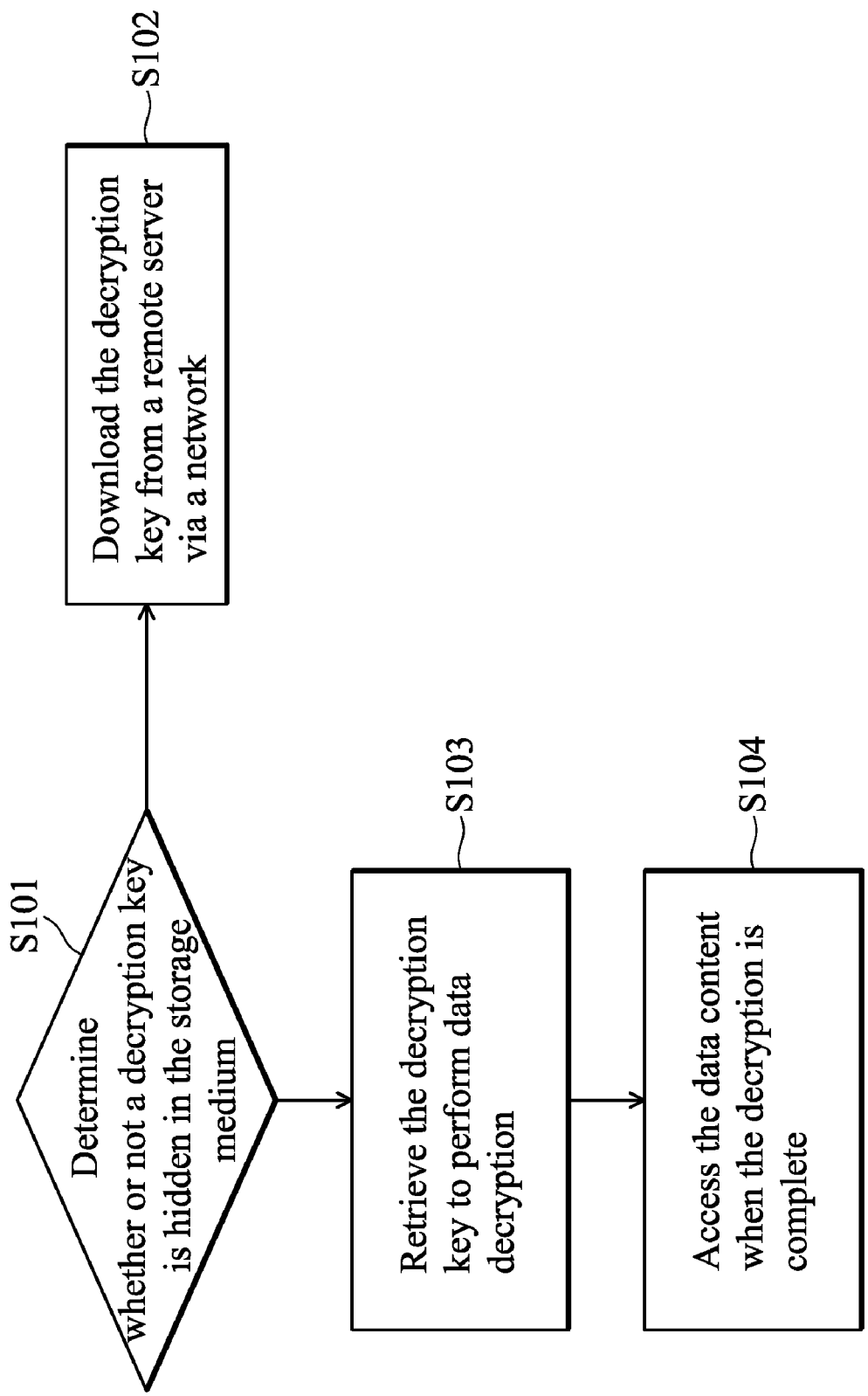
FIG. 1 is a schematic view of a conventional method for data encryption and decryption for digital rights management.

Several exemplary embodiments of the invention are described with reference to FIGS. 2 through 3, which generally relate to hiding the decryption key in a dispersive way. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method and system for hiding the decryption key in a dispersive way.

An embodiment of the method divides a decryption key to at least two data portions and protects the data portions using an identical method or different ways that stores the data portions in a storage medium or even another external storage medium. When encrypted data content is going to be accessed under authorization, the decryption key is recombined using a specific way to decrypt the content.

Figure 2:
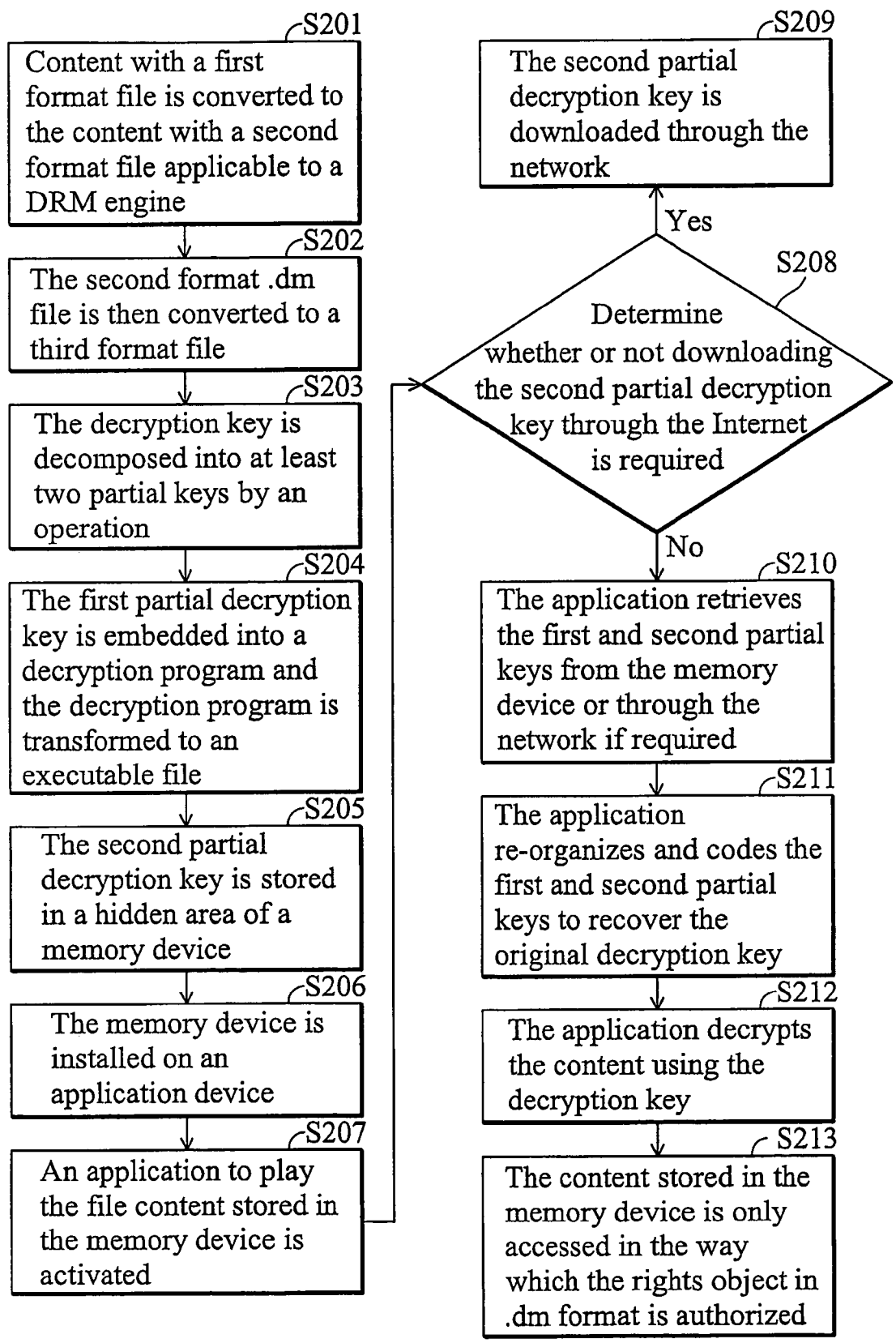
FIG. 2 is a flowchart of a method for hiding the decryption key in a dispersive way of the present invention.

FIG. 2 is a flowchart of a method for hiding the decryption key in a dispersive way of the present invention.

Content with a first format (.mp3, for example) is converted to the content with a second format (.dm for Open Mobile Alliance (OMA) DRM version 1.0, for example) applicable to a digital rights management (DRM) engine (step S201). The content with the second format is encrypted using an encryption program, such as the Advanced Encryption System (AES), and an encryption key (named key A, which is a 128-bit string). The second format .dm file is then converted to a third format file (.aes, for example) (step S202). Since AES is a symmetric encryption scheme, the encryption key A is also the key for decryption.

The decryption key is decomposed into at least two partial decryption keys (first partial decryption key (key B, for example) and second partial decryption key (key C, for example)) by an operation, such as exclusive OR, symbolized by $\oplus$, so that B$\oplus$C=A (step S203). Thus, the key B and key C only comprise a portion of data of the key A and the key A can be completely obtained when the key B and key C are simultaneously retrieved and processed with a specific operation. The first partial decryption key (the key B, for example) is embedded into an application (representing a decryption program) and the application is transformed to an executable file (.sis for Symbian S60 V3, for example) for an electronic device using a compiler corresponding to an operating system (Symbian S60 V3, for example) of the electronic device (step S204). The executable file is represented by low-level machine language which cannot be decompiled or is decompiled to generate meaningless binary codes, so that the application and the key B cannot be recognized.

The second partial decryption key (the key C, for example) is stored in a hidden area of a memory device (a memory card, for example) (step S205). The hidden area is created using a firmware associated with the microcontroller of the memory device. The reading and writing of data in the hidden area must be performed by specific software supported by the microcontroller and the software is packaged into the application to be transformed to the machine language, so that the hidden area and the key C cannot be recognized either. The hidden area is not defined by the industry protocol. Thus, even a person skilled in the art cannot easily access the hidden area to retrieve the key C. The key C can also be stored in a separate area, such as a remote server, from the memory device, thus further preventing the key C from being detected and retrieved.

When the memory device is installed on an electronic device (step S206), the application to access the content stored in the memory device is activated (step S207). It is determined whether or not downloading the second partial decryption key through the network is required (step S208). If required, the second partial decryption key (the key C as described, for example) is downloaded through the network (step S209). If no partial decryption key is required to be downloaded through the network, the application retrieves the first and second partial decryption keys (the keys B and C as described, for example) from the memory device, or the application retrieves the first partial decryption key (the key B, for example) from the memory device and downloads the second partial decryption key (the key C, for example) through the network if required (step S210), and re-organizes and codes the first and second partial decryption keys to recover the original decryption key (the key A as described, for example) (step S211).

The application decrypts the content using the decryption key (step S212) that the content with .dm format is recovered from .aes format. The digital rights management engine of the electronic device is activated by the application to convert the content with .dm format to .dcf format executable for OMA version 1.0, enabling the content stored in the memory device to only be accessed in the way which the rights object in .dm format is authorized. (step S213).

It is noted that the partial decryption keys can be further encrypted by another encryption program. Additionally, the invention focuses on decomposing the decryption key into several partial keys and places the partial keys in different positions of a memory device or in different storage media for preferable protection. Thus, storing the first partial decryption key in a memory device and the second partial decryption key in a hidden area of the memory device or even a server outside the memory device can clearly and completely describe the concept of the invention and is only exemplary but is not to be limitative.

Figure 3:
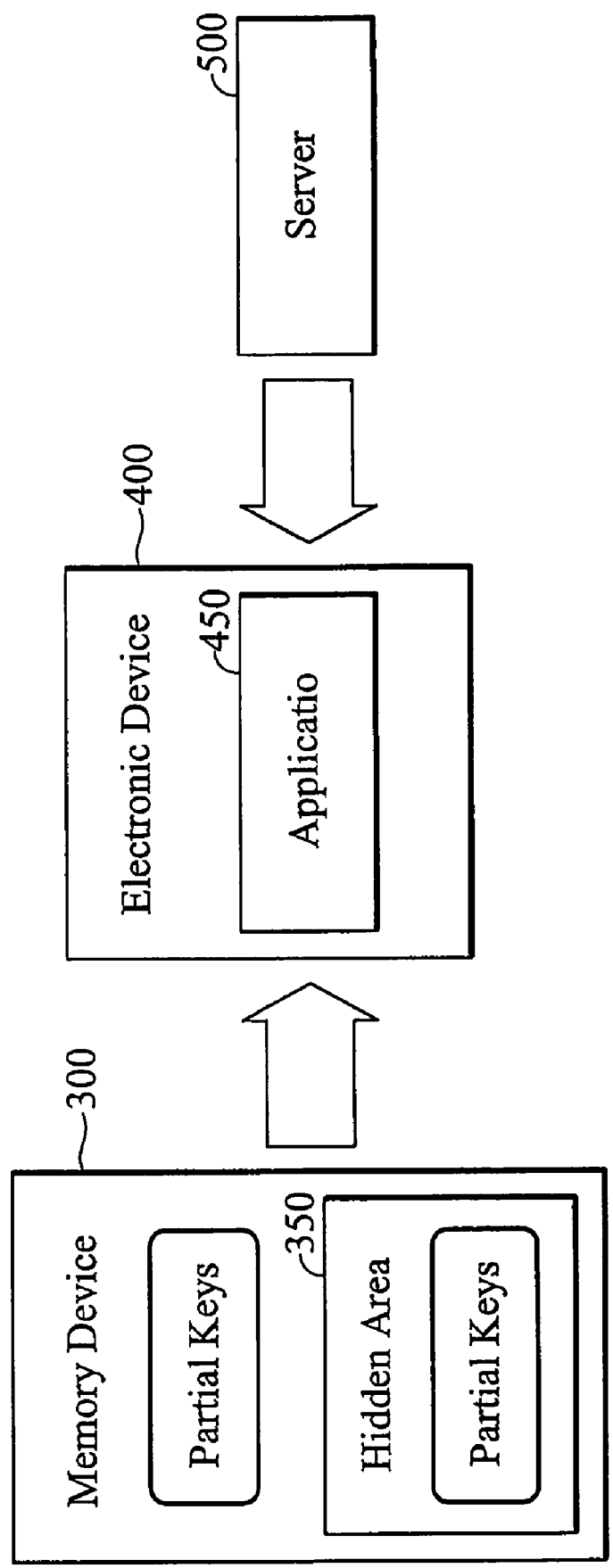
FIG. 3 is a schematic view of a system for hiding the decryption key in a dispersive way of the present invention.

FIG. 3 is a schematic view of a system for hiding the decryption key in a dispersive way of the present invention.

The system comprises a memory device 300, an electronic device 400, and a server 500 connected to the electronic device 400 via a network, such as internet. The electronic device 400 provides an application 450. The memory device 300 stores a first partial decryption key of an original decryption key (named an encryption key as well) for content to be accessed. The encryption key is used to encrypt a pretreated content. The memory device 300 further provides a hidden area 350 to store a second partial decryption key of the original decryption key.

The hidden area is created using a firmware associated with the microcontroller of memory device 300. The reading and writing of data in the hidden area must be supported by specific software provided by the microcontroller and the software is packaged into the application to be transformed to the machine language, so that the hidden area and the second partial decryption key stored in the hidden area cannot be recognized.

Additionally, the first partial decryption key not stored in the hidden area is embedded into an application and the application is transformed to an executable file (.sis for Symbian S60 V3, for example) for the electronic device 400 using a compiler corresponding to an operating system (Symbian S60 V3, for example) of the electronic device 400. The executable file is represented by low-level machine language which cannot be decompiled or is decompiled to generate meaningless binary codes, so that the application and the first partial decryption key not stored in the hidden area cannot be recognized.

It is noted that the first partial key which is embedded in the application may also be stored in the server 500. It is further noted that the second partial decryption key stored in the hidden area may also be stored in the server 500. Additionally, the original decryption key can be divided to more two partial decryption keys.

When the memory device 300 is installed on the electronic device 400, the application 450 to access the content stored in the memory device 300 is activated. The application 450 determines whether or not downloading the second partial decryption key through the network is required. If required, the second partial decryption key is downloaded from the server 500 through the network. If no partial decryption key is required to be downloaded through the network, the application 450 retrieves the first and second partial decryption keys from the memory device 300 or retrieves the first partial decryption key from the memory device 300 and downloads the second partial decryption key from the server 500, if required, and re-organizes and codes the first and second partial decryption keys to recover the original decryption key. The application 450 decrypts the content using the decryption key, enabling the electronic device 400 to access the content.

In this embodiment of the method, base data of a decryption key for encrypted content is dispersed and stored in different addresses of a storage medium storing the encrypted content, or a portion thereof is stored in an external storage medium, such as a server. The dispersed and stored base data is hidden and protected using an identical method or different ways and is recombined using a specific application program when decryption is required. If a portion of the base data is stored in an external storage medium, the externally stored based data is retrieved via a network. Thus, multiple protections for the decryption key can be achieved.

Methods and systems of the present disclosure, or certain aspects or portions of embodiments thereof, may take the form of a program code (i.e., instructions) embodied in media, such as SD card or USB disc, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of hiding the decryption key in a dispersive way, comprising:
   decomposing a decryption key corresponding to content to be accessed into at least two partial decryption keys, comprising first partial decryption key and second partial decryption key;
   storing the first partial decryption keys in a memory device;
   storing the second partial decryption keys in a hidden area of the memory device;
   embedding the first partial decryption key into an application of an electronic device;
   transforming the application to an executable file for the electronic device using a compiler corresponding to an operating system of the electronic device;
   when the memory device is installed on the electronic device, activating the application installed in the electronic device;
   the application retrieving the first partial decryption keys from the memory device and the second partial decryption keys from the hidden area of the memory device;
   the application re-organizing and coding the first and second partial decryption keys to recover the decryption key; and
   the application decrypting the content using the decryption key, enabling the electronic device to access the content.

2. The method of hiding the decryption key in a dispersive way as claimed in claim 1, wherein the step of decomposing the decryption key further comprises:
   converting the content with a first format to the content with a second format applicable to a digital rights management engine; and
   encrypting the content with the second format using an encryption key and an encryption program to convert the content with the second format to the content with a third format.

3. The method of hiding the decryption key in a dispersive way as claimed in claim 2, wherein the step of decomposing the decryption key further comprises:
   implementing an operation to decompose the decryption key into more than two partial keys; the decryption key can be recovered by applying the operation on its partial keys.

4. The method of hiding the decryption key in a dispersive way as claimed in claim 1, wherein the second partial decryption key is stored in a server, connected to the electronic device through a network.

5. The method of hiding the decryption key in a dispersive way as claimed in claim 4, wherein
   determining whether or not downloading the second partial decryption key through the network is required; and
   if required, the application retrieving the first partial decryption key from the memory device and the second partial decryption key from the server.

6. A system of hiding the decryption key in a dispersive way, comprising:
   a memory device, storing first partial decryption key of a decryption key corresponding to content to be accessed and providing a hidden area storing second partial decryption key of the decryption key; and
   an electronic device, installed with an application, wherein, when the memory device is installed on the electronic device, the application is activated to retrieve the first partial decryption key from the memory device and the second partial decryption key from the hidden area of the memory device, re-organize and code the first and second partial decryption keys to recover the decryption key, and decrypt the content using the decryption key, enabling the electronic device to access the content; and the content with a first format is converted to the content with a second format applicable to a digital rights management (DRM) engine of the electronic device; the content with second format is further converted to the content with a third format by using an encryption key and an encryption program.

7. The system of hiding the decryption key in a dispersive way as claimed in claim 6, further comprising a server connected to the electronic device through a network, wherein the second partial decryption key is stored in the server.

8. The system of hiding the decryption key in a dispersive way as claimed in claim 6, wherein the application determines whether or not downloading the second partial decryption key through a network is required and, if required, retrieves the first partial decryption key from the memory device and the second partial decryption key from the server.

9. The system of hiding the decryption key in a dispersive way as claimed in claim 6, wherein the hidden area is created using a firmware of a microcontroller of the memory device.

10. A non-transitory computer-readable medium encoded with computer executable instructions for performing a method of hiding the decryption key in a dispersive way, the computer executable instructions comprising:
   decomposing a decryption key corresponding to content to be accessed into at least two partial decryption keys, comprising first partial decryption key and second partial decryption key;
   converting the content with a first format to the content with a second format applicable to a digital rights management engine;
   encrypting the content with the second format using an encryption program and encryption key to convert to the content with a third format;
   storing the first partial decryption key in a memory device;
   storing the second partial decryption key in a hidden area of the memory device;
   when the memory device is installed on an electronic device, activating an application installed in the electronic device;
   the application retrieving the first partial decryption key from the memory device and the second partial decryption key from the hidden area of the memory device;
   the application re-organizing and coding the first and second partial decryption keys to recover the decryption key; and
   the application decrypting the content using the decryption key, enabling the electronic device to access the content.

11. The non-transitory computer-readable medium as claimed in claim 10, wherein the step of decomposing the decryption key further comprises:
   implementing an operation to decompose the decryption key into more than two partial keys; the decryption key can be recovered by applying the operation on its partial keys.

12. The non-transitory computer-readable medium as claimed in claim 10, further comprising:
   embedding the second decryption key into the application of the electronic device; and
   transforming the application to an executable file for the electronic device using a compiler corresponding to an operating system of the electronic device.

13. The non-transitory computer-readable medium as claimed in claim 10, wherein
   determining whether or not to download the second partial decryption key through a network is required; and
   if required, the application retrieves the first partial decryption key from the memory device and the second partial decryption key from a server connected to the electronic device.

* * * * *